US012806108B2

(12) United States Patent
Ligot

(10) Patent No.: US 12,806,108 B2
(45) Date of Patent: Nov. 24, 2026

(54) STRETCHING DEVICE

(71) Applicant: ROUNDBOX FITNESS, LLP, Seattle, WA (US)

(72) Inventor: Curt Ligot, Seattle, WA (US)

( * ) Notice: Subject to any disclaimer, the term of this patent is extended or adjusted under 35 U.S.C. 154(b) by 337 days.

(21) Appl. No.: 18/749,584

(22) Filed: Jun. 20, 2024

(65) Prior Publication Data

US 2024/0415719 A1 Dec. 19, 2024

Related U.S. Application Data

(60) Provisional application No. 63/509,015, filed on Jun. 19, 2023.

(51) Int. Cl.

*A61H 1/02* (2006.01)
*A61H 15/00* (2006.01)
*A61H 39/04* (2006.01)

(52) U.S. Cl.

CPC ....... *A61H 1/0274* (2013.01); *A61H 15/0092* (2013.01); *A61H 39/04* (2013.01); *A61H 2201/1671* (2013.01); *A61H 2201/169* (2013.01)

(58) Field of Classification Search

CPC ......... A63B 21/00; A63B 23/00; A63B 22/00; A61H 1/02

See application file for complete search history.

(56) References Cited

U.S. PATENT DOCUMENTS 5,284,458 A * 2/1994 Perry .................. A63B 21/169 482/121
5,536,227 A * 7/1996 Polchek ............ A63B 21/0728 482/106
5,536,229 A * 7/1996 Albergo ........... A63B 21/00047 482/148
7,056,268 B2 * 6/2006 Emick ................ A63B 21/4035 482/106
9,532,640 B2 1/2017 Mallett
10,029,137 B2 * 7/2018 Davis ................. A63B 21/4035
2019/0282847 A1 * 9/2019 Acuna, Jr. .......... A63B 23/1218

* cited by examiner

*Primary Examiner* — Adam C Ortiz

(74) *Attorney, Agent, or Firm* — Heidi Eisenhut; LOZA & LOZA, LLP

(57) ABSTRACT

Embodiments are directed to a portable stretching device for physical therapy, fitness and exercise that improves flexibility, enhances physical performance, prevent injuries, improves muscle recovery, improves posture, improves stress relief, increases blood circulation, increases mental focus, and increases mindfulness.

17 Claims, 10 Drawing Sheets

STRETCHING DEVICE

CLAIM OF PRIORITY

The present application for patent claims priority to U.S. Provisional Application No. 63/509,015 entitled "Stretching Device", filed Jun. 19, 2023, which is hereby expressly incorporated by reference.

FIELD

The present disclosure relates to a portable stretching device that can be used for physical therapy, fitness, and exercise.

BACKGROUND

Stretching is a form of physical exercise that offers numerous benefits for the body and mind. More specifically, stretching deliberately expands and flexes a specific muscle or tendon (or muscle group) to improve the muscle's felt elasticity and achieve comfortable muscle tone. Some benefits of stretching include improved flexibility, enhanced physical performance, injury prevention, muscle recovery, improved posture, stress relief, increased blood circulation, mental focus, and mindfulness.

Improved Flexibility: Stretching regularly helps improve flexibility by lengthening and loosening muscles, tendons, and ligaments. This increased flexibility enhances your range of motion, making daily activities easier and reducing the risk of muscle strains or injuries.

Enhanced Physical Performance: By increasing flexibility, stretching can improve your physical performance in various activities. Whether you're an athlete, a gym enthusiast, or simply engaging in everyday tasks, improved flexibility allows for better movement, agility, and coordination.

Injury Prevention: Stretching plays a crucial role in injury prevention. By keeping your muscles flexible and supple, stretching reduces muscle imbalances and improves muscular symmetry. This helps alleviate undue stress on joints, tendons, and other soft tissues, decreasing the likelihood of injuries during physical activities or workouts.

Muscle Recovery: Stretching after exercise can aid in muscle recovery. It promotes blood flow to the muscles, assisting in the removal of metabolic waste products and supplying fresh oxygen and nutrients. Stretching also helps reduce muscle soreness, stiffness, and fatigue, allowing for a faster recovery process.

Improved Posture: Stretching can help correct and improve posture. Regular stretching of tight muscles, particularly those in the chest, shoulders, and hips, can counteract the effects of prolonged sitting and hunching over electronic devices. This promotes a more upright posture, reducing strain on the spine and contributing to overall musculoskeletal health.

Stress Relief: Stretching not only benefits the body but also provides mental relaxation. Engaging in stretching exercises, especially those involving deep breathing and gentle movements, can help release physical and mental tension, promote relaxation, and reduce stress levels.

Increased Blood Circulation: Stretching stimulates blood circulation throughout the body. Improved circulation ensures that organs and muscles receive an adequate supply of oxygen and nutrients, promoting overall cardiovascular health and facilitating optimal bodily function.

Mental Focus and Mindfulness: Incorporating stretching into your routine can serve as a mindful practice. By focusing on the sensations in your body and being present in the moment, stretching helps improve mental focus, concentration, and mindfulness, offering a brief respite from the demands of daily life.

The result is a feeling of increased muscle control, flexibility, and range of motion. Stretching is also used therapeutically to alleviate cramps and to improve function in daily activities by increasing range of motion.

SUMMARY

The following presents a simplified summary of one or more implementations in order to provide a basic understanding of some implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

According to one example, a stretching device for stretching muscles of the human body is provided. The stretching device comprises an elongated shaft extending along an axis having a proximal end and a distal end; a first plurality of holes extending along a length of the elongated shaft; a second plurality of holes extending along the length of the elongated shaft, where the first plurality of holes is in parallel alignment with the second plurality of holes; a foam pad slideably secured to an outer surface of the elongated shaft; and one or more attachments secured to the first and second plurality of holes in the elongated shaft.

According to one feature, the elongated shaft is hollow and cylindrical.

According to another feature, an inner diameter of the elongated shaft is 27 mm and an outer diameter of the elongated shaft is 35 mm.

According to yet another feature, the elongated shaft is made from Acrylonitrile Butadiene Styrene.

According to yet another feature, the one or more attachments is a handle.

According to yet another feature, the handle is comprised of a first handle part and a second handle part where the first handle part is threadingly engaged with the second handle part.

According to yet another feature, the handle extends perpendicularly outward from the elongated shaft.

According to yet another feature, the one or more attachments is a ball for myofascial trigger point release and deep tissue massage.

According to yet another feature, stretching device further includes a rotating platform. The rotating platform comprises a base having a rotating mechanism secured thereon; a platform secured to the rotating mechanism, the platform configured to rotate with resect to the base; and a T-connector secured to the platform by a pair of bracket and configured to receive an end of the elongated shaft.

According to another example, a stretching device for stretching muscles of the human body is provided. The stretching device includes an elongated shaft extending along an axis having a proximal end and a distal end; a first plurality of holes extending along a length of the elongated shaft; a second plurality of holes extending along the length of the elongated shaft, where the first plurality of holes is in parallel alignment with the second plurality of holes; a foam pad slideably secured to an outer surface of the elongated shaft; one or more attachments secured to the first and second plurality of holes in the elongated shaft; and a rotating platform. The rotating platform comprises a base having a rotating mechanism secured thereon; a platform secured to the rotating mechanism, the platform configured to rotate with resect to the base; and a T-connector secured to the platform by a pair of bracket and configured to receive an end of the elongated shaft.

According to one feature, elongated shaft is hollow and cylindrical.

According to another feature, an inner diameter of the elongated shaft is 27 mm and an outer diameter of the elongated shaft is 35 mm.

According to yet another example, a stretching device for stretching muscles of the human body is provided. The stretching device includes an elongated shaft extending along an axis having a proximal end and a distal end; a first plurality of holes extending along a length of the elongated shaft; a second plurality of holes extending along the length of the elongated shaft, where the first plurality of holes is in parallel alignment with the second plurality of holes; a foam pad slideably secured to an outer surface of the elongated shaft; and one or more attachments secured to the first and second plurality of holes in the elongated shaft; and wherein an inner diameter of the elongated shaft is 27 mm and an outer diameter of the elongated shaft is 35 mm.

According to one feature, the stretching device comprises a rotating platform, the rotating platform comprising a base having a rotating mechanism secured thereon; a platform secured to the rotating mechanism, the platform configured to rotate with resect to the base; and a T-connector secured to the platform by a pair of bracket and configured to receive an end of the elongated shaft.

According to another feature, the elongated shaft is hollow and cylindrical.

According to yet another feature, the elongated shaft is made from Acrylonitrile Butadiene Styrene.

According to yet another feature, the one or more attachments is a handle.

According to yet another feature, the handle is comprised of a first handle part and a second handle part where the first handle part is threadingly engaged with the second handle part.

According to yet another feature the handle extends perpendicularly outward from the elongated shaft.

According to yet another feature, the one or more attachments is a ball for myofascial trigger point release and deep tissue massage.

DETAILED DESCRIPTION

In the following description, specific details are given to provide a thorough understanding of the embodiments. However, it will be understood by one of ordinary skill in the art that the embodiments may be practiced without these specific details.

The present disclosure is directed to a portable stretching device for physical therapy, fitness and exercise that improves flexibility, enhances physical performance, prevent injuries, improves muscle recovery, improves posture, improves stress relief, increases blood circulation, increases mental focus, and increases mindfulness.

Figure 1:
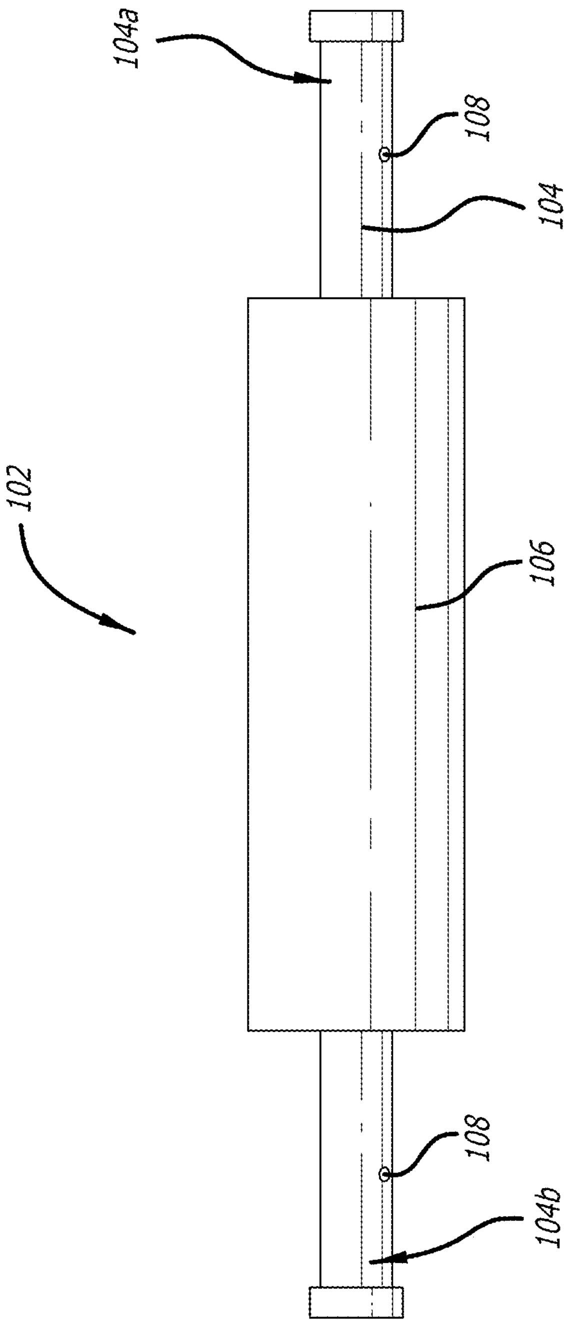
FIG. 1 illustrates a stretching device in accordance with one aspect of the present disclosure.
Figure 2:
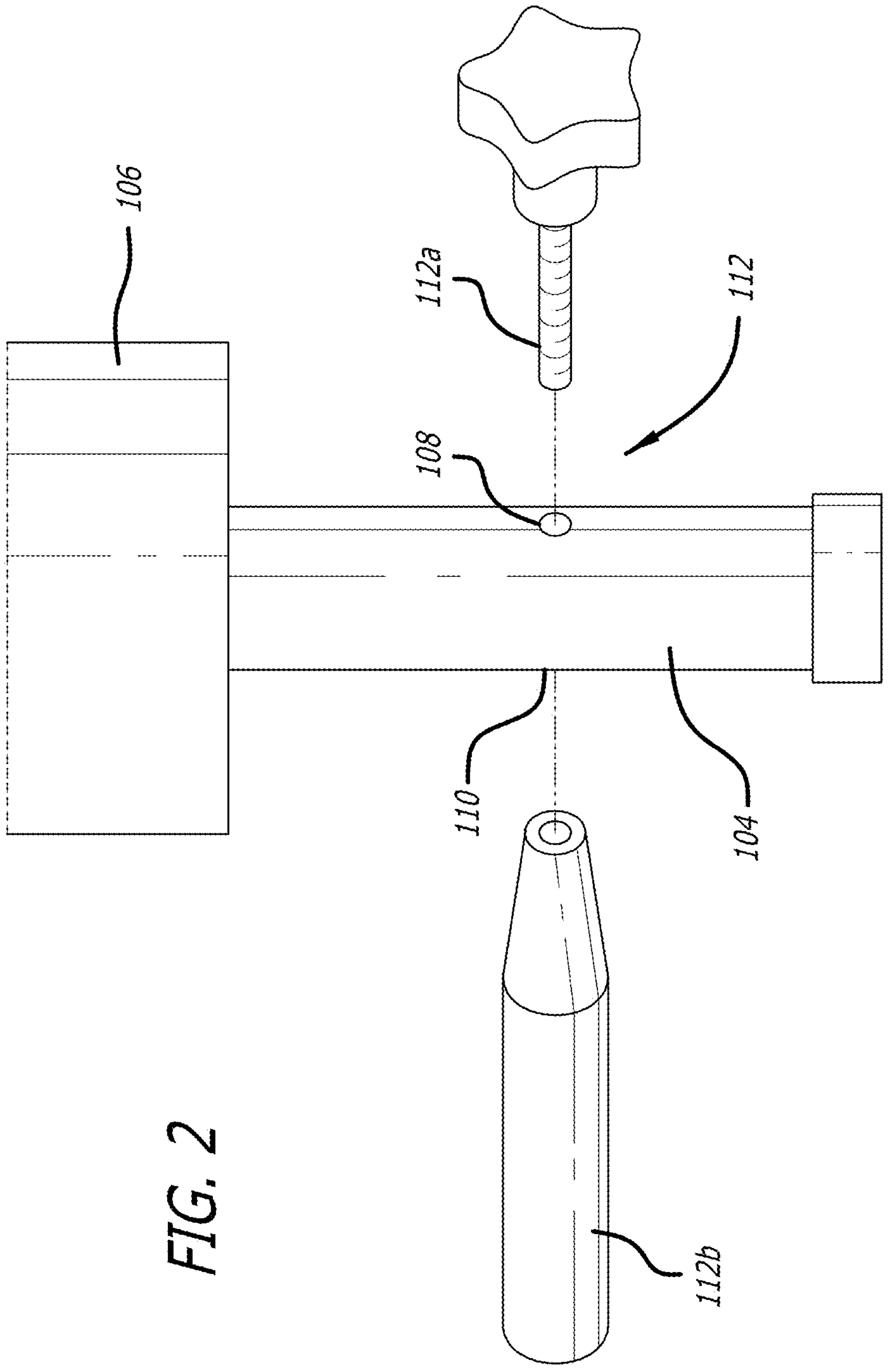
FIG. 2 illustrates a partial view of a stretching device showing a detachable handle, according to one aspect of the present disclosure.
Figure 3:
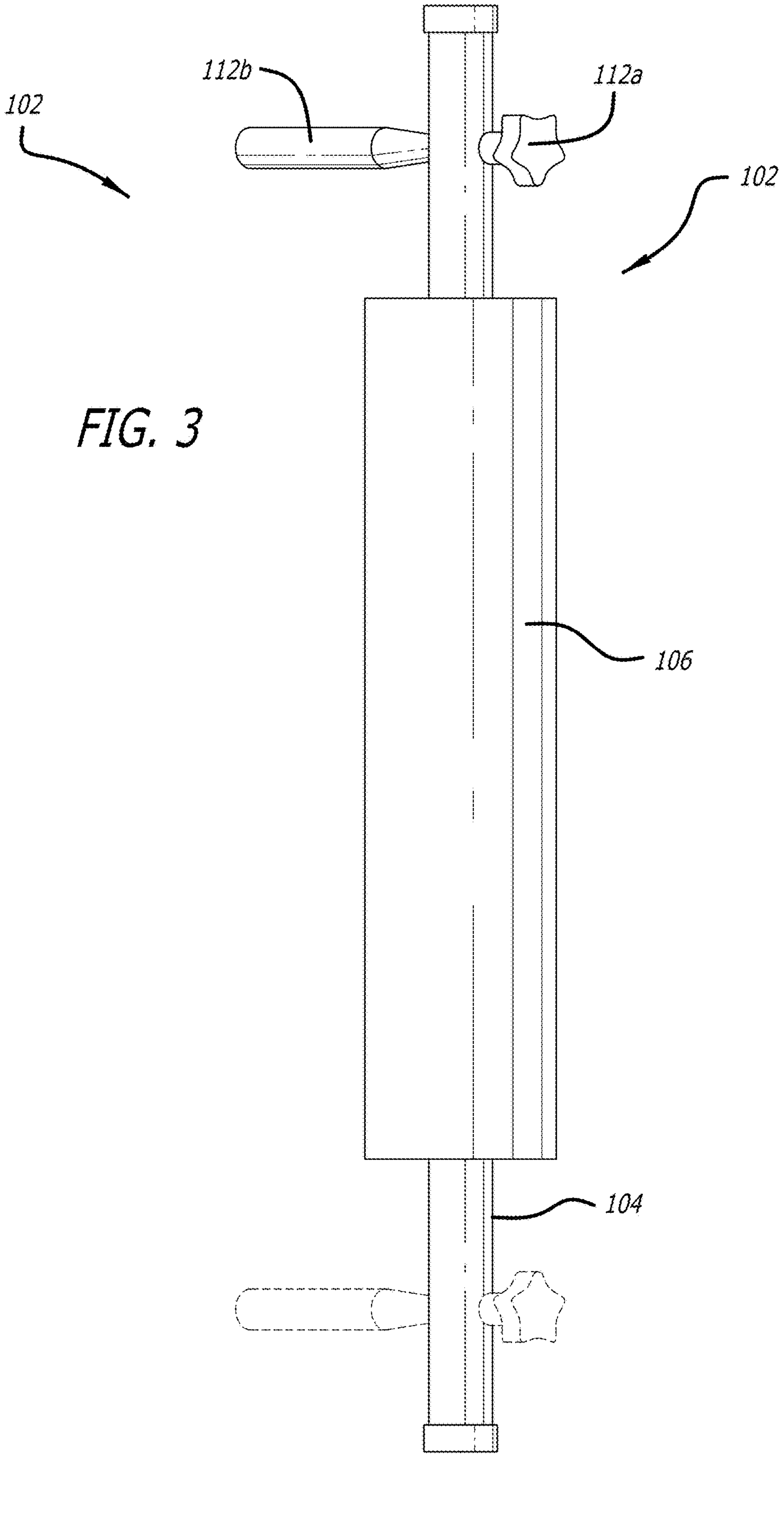
FIG. 3 illustrates the stretching device of FIG. 1 showing a pair of handles attached thereon.
Figure 4A:
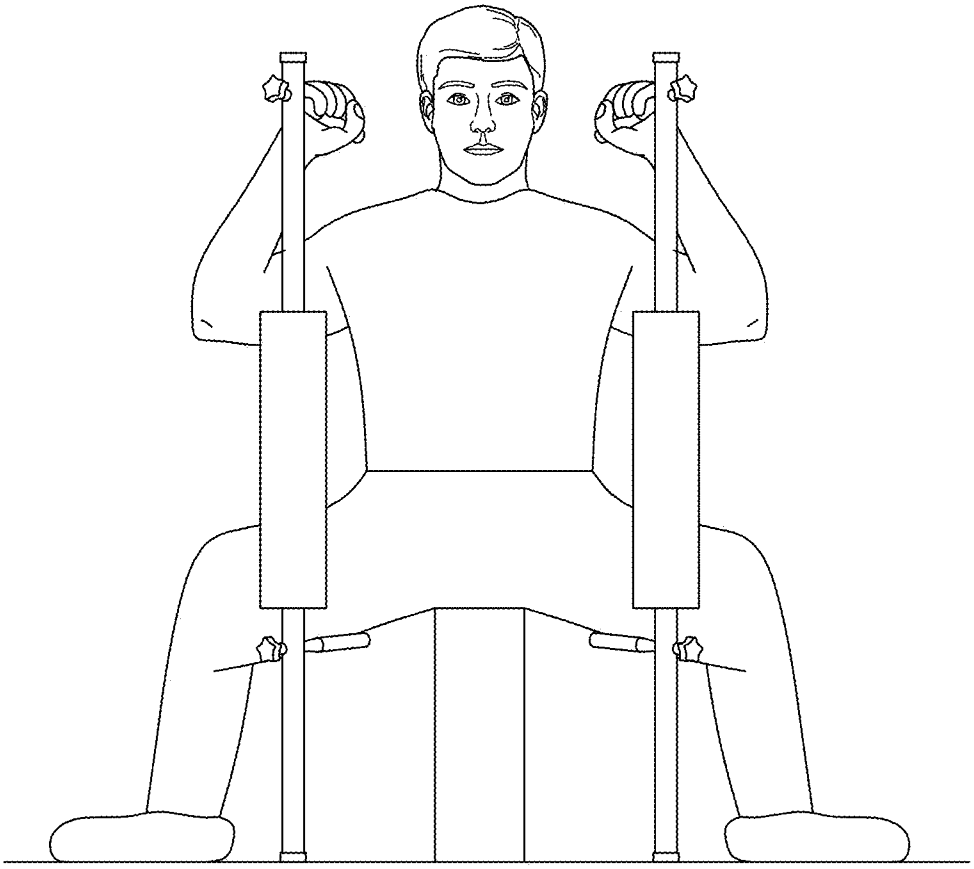
FIG. 4A illustrates a user utilizing a pair of stretching devices for stretching the adductors or inner thighs of the user in a first position.
Figure 4B:
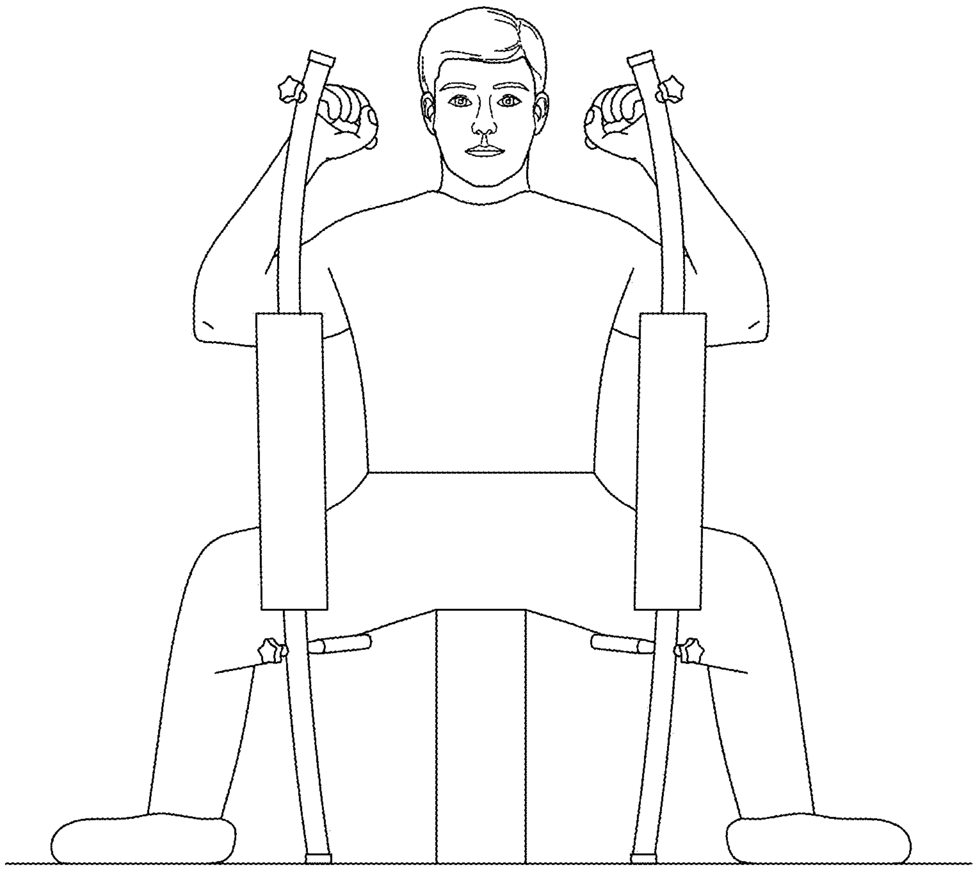
FIG. 4B illustrates a user utilizing a pair of stretching devices for stretching the adductors or inner thighs of the user in a second position.
Figure 5:
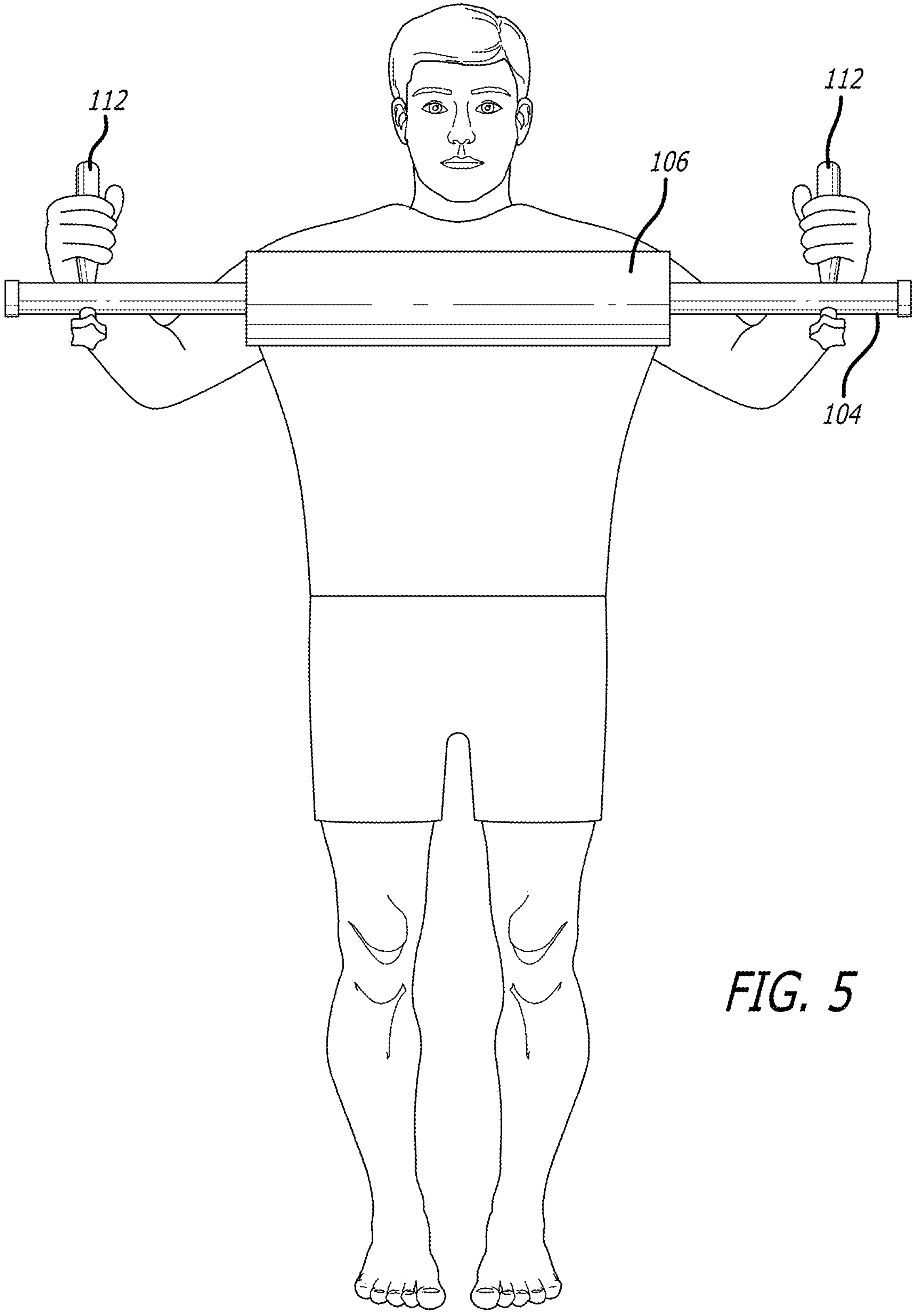
FIG. 5 illustrates a user utilizing a stretching device for stretching the obliques and lower back of the user.
Figure 6:
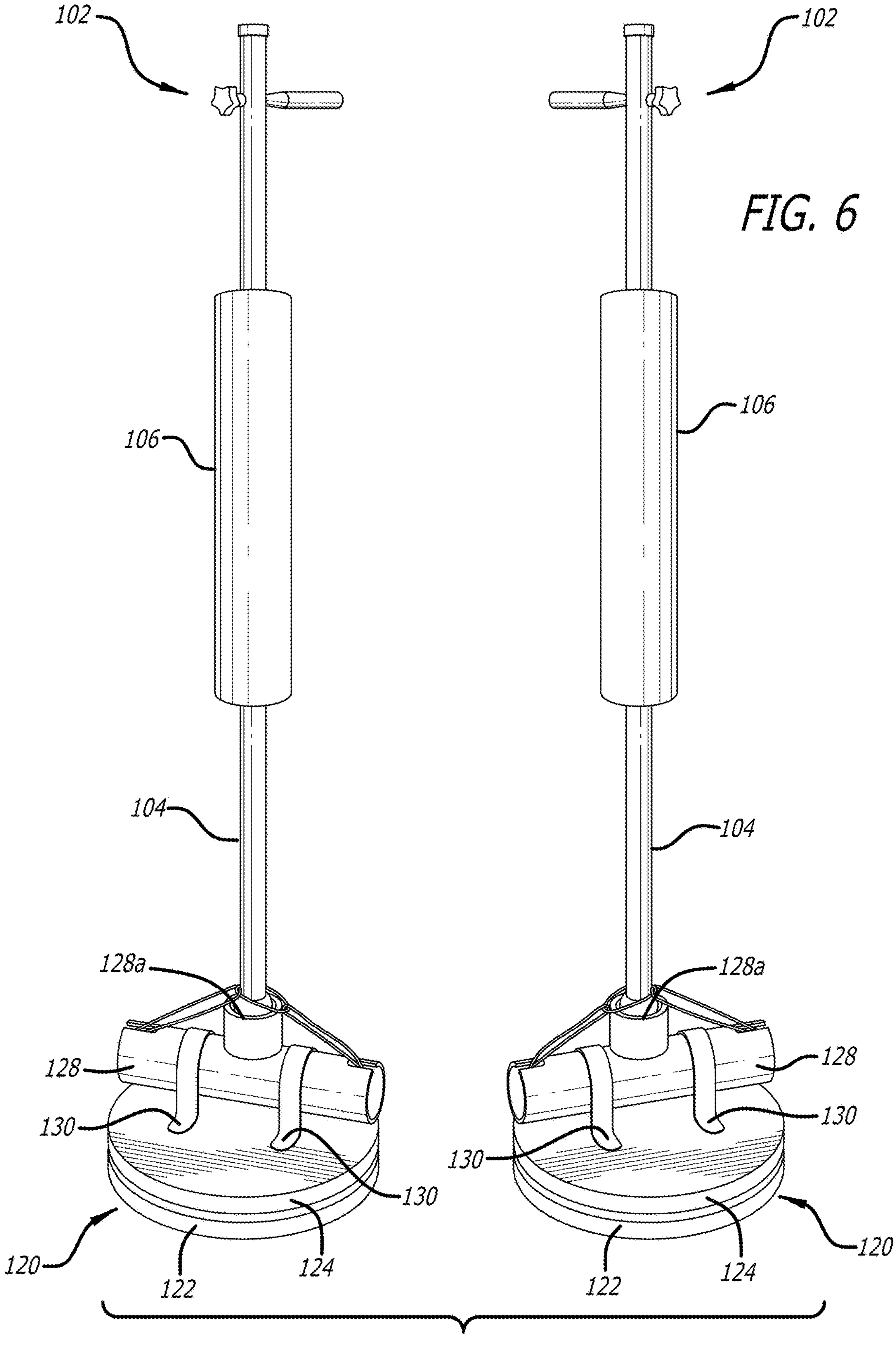
FIG. 6 illustrates a stretching device utilized with a rotating platform, according to one aspect of the present disclosure.
Figure 7:
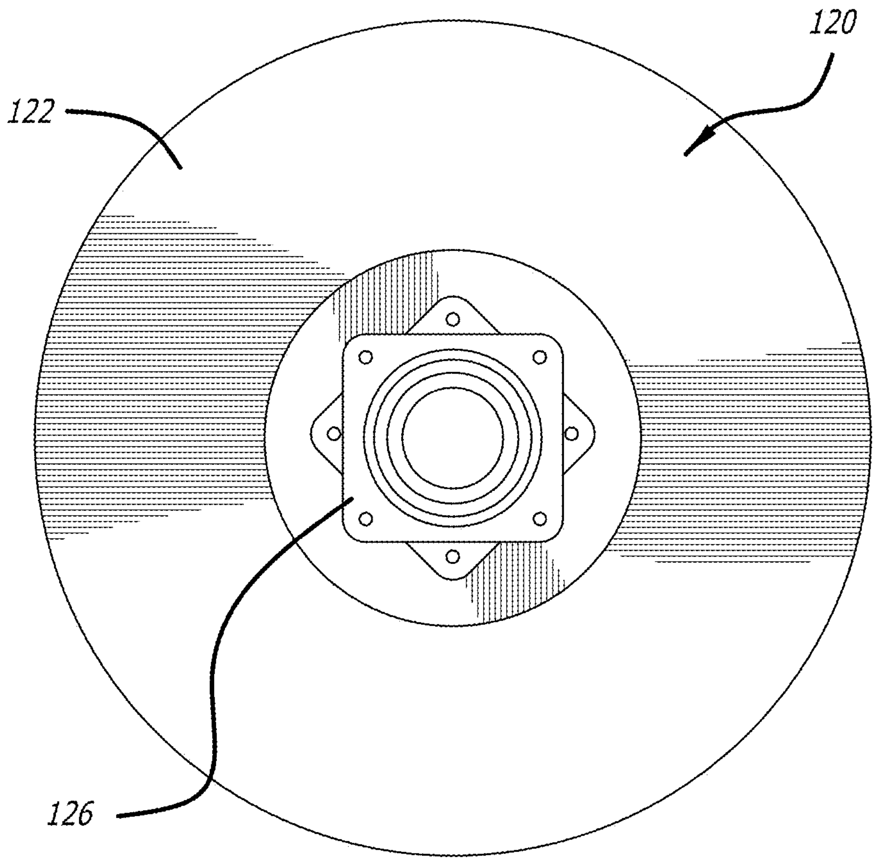
FIG. 7 illustrates a base of a rotating platform for use with a stretching device, according to one aspect of the present disclosure.
Figure 8:
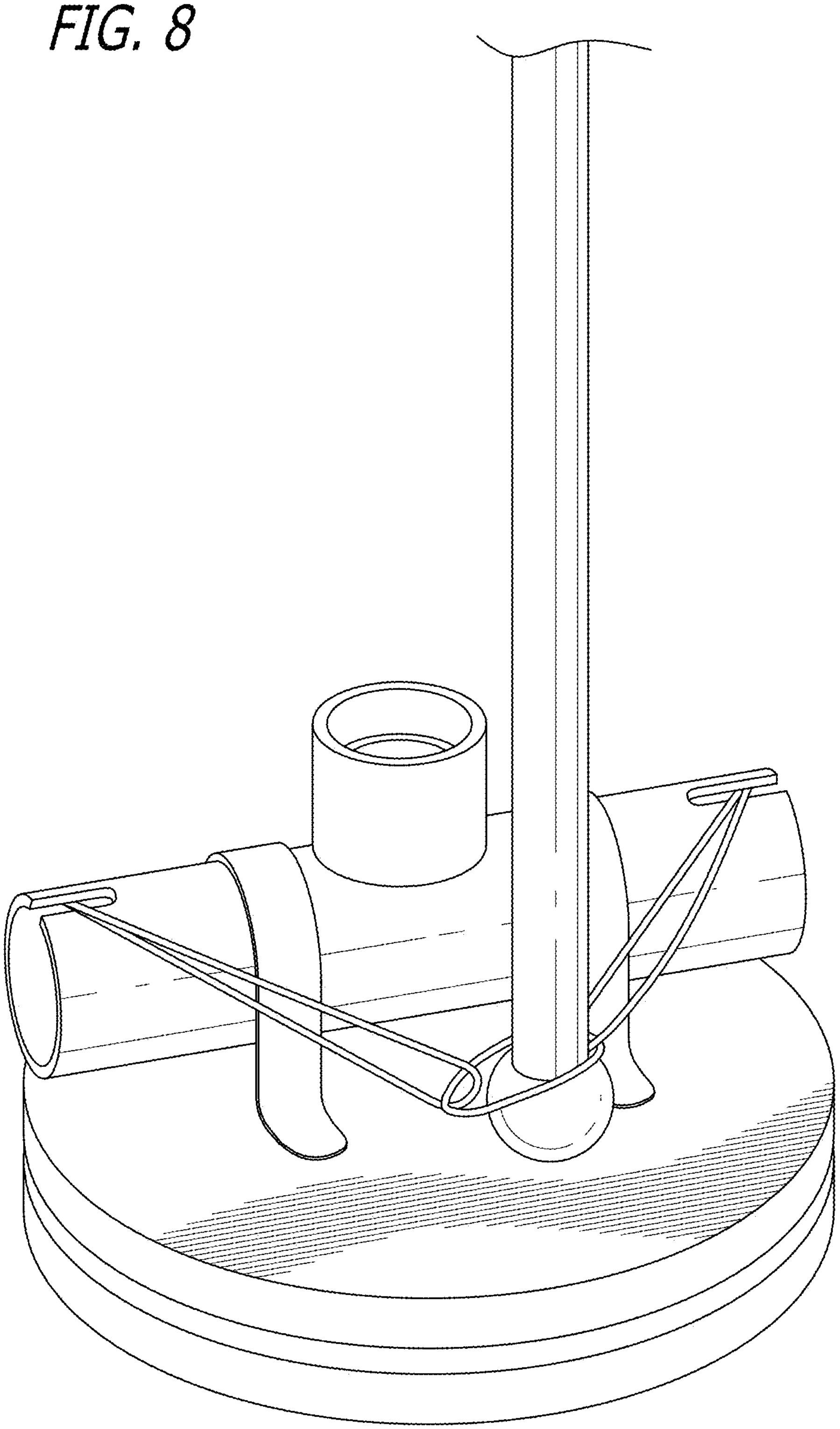
FIG. 8 illustrates a rotating platform for use with a stretching device, according to one aspect of the present disclosure.
Figure 9:
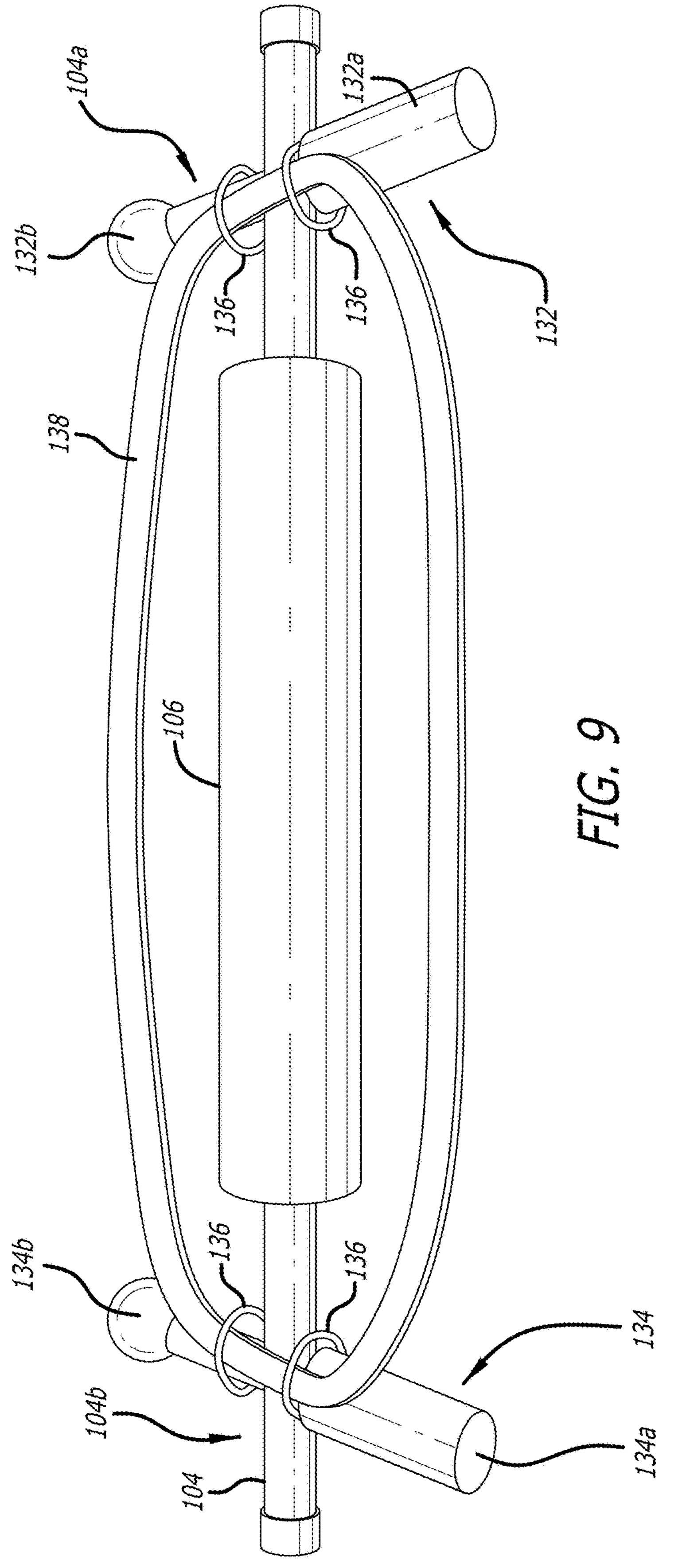
FIG. 9 illustrates a stretching device in accordance with one aspect of the present disclosure.

FIG. 1 illustrates a stretching device in accordance with one example of the present disclosure. FIG. 2 illustrates a partial view of a stretching device showing a detachable handle, according to one aspect of the present disclosure. FIG. 3 illustrates the stretching device of FIG. 1 showing a pair of handles attached thereon. FIG. 4A illustrates a user utilizing a pair of stretching devices for stretching the adductors or inner thighs of the user in a first position. FIG. 4B illustrates a user utilizing a pair of stretching devices for stretching the adductors or inner thighs of the user in a second position. FIG. 5 illustrates a user utilizing a stretching device for stretching the obliques and lower back of the user. FIG. 6 illustrates a stretching device utilized with a rotating platform, according to one aspect of the present disclosure. FIG. 7 illustrates a base of a rotating platform for use with a stretching device, according to one aspect of the present disclosure. FIG. 8 illustrates a rotating platform for use with a stretching device, according to one aspect of the present disclosure. FIG. 9 illustrates a stretching device in accordance with one aspect of the present disclosure. The following discussion refers interchangeably to FIGS. 1-9.

Turning to FIG. 1, one example of a stretching device 102 in accordance with one example of the present disclosure is illustrated. The stretching device 102 may include an elongated shaft 104 extending along an axis and having a proximal end **104*a* and a distal end 104*b*. One or more pads 106, such as foam pads, may be located on an outer surface of the elongated shaft 104 to provide the user comfort while resting body parts on or against the stretching device 102. The foam pads 106 provide enough give so not only is it comfortable enough to be used on the neck but provide feedback so that when the user pushes into the foam pad 106, more nerve endings may be activated. The foam pads 106 may be fixedly attached to the elongated shaft 104. Alternatively, the foam pads 106 may be moveable up and down the length of the elongated shaft 104 as well as rotatable around the outer surface of the elongated shaft 104. This allows the user to adjust the foam pads 106** for optimal position and comfort.

The elongated shaft 104 may include a first plurality of holes 108 extending along a length of the proximal end **104*a* of the elongated shaft 104** and a second plurality of holes

110 extending along a length of the distal end 104*b* of the elongated shaft 104, where the first plurality of holes 108 is in parallel alignment with the second plurality of holes 110. The first plurality of holes 108 may be equally spaced apart along the elongated shaft 104. The second plurality of holes 110 may be equally spaced apart along the elongated shaft 104. In one aspect, the first and second plurality of holes 108, 110 extend through the elongated shaft 102.

The first and second plurality of holes 108, 110 may receive a number of external attachments for various functions. According to one example, the attachments may include a variety of handles for gripping the stretching device 102 and isolating the muscles and/or tendons to be stretched. According to another example, the attachments may include different sized ball heads, such as rubber balls, that come in various sizes, densities and textures, which may be utilized for myofascial trigger point release and deep tissue massage. The attachments 112 shown in FIGS. 2 and 3 are in the form of a handle, although this is by way of example only. According to one embodiment, the handle 112 may be comprised of a first handle part 112*a* and a second handle part 112*b*. The first handle part 112*a* comprises a threaded portion secured to, and extending perpendicularly outward from, a knob while the second handle part 114*b* comprises an elongated member having a substantially cylindrical shape and configured to threadingly engage with the threaded portion of the first handle part 112*a*, thereby forming a complete handle 112. However, the handle 112 may be secured to the elongated shaft 104 by any means known in the art.

As shown in FIG. 2, the threaded portion of the first handle part 112*a* of the handle 112 may be inserted through a hole in the first plurality of holes 108 and extend outwardly from a hole in the second plurality of holes 110. The second handle part 112*b* may then be secured to the first handle part 112*a*. FIG. 3 illustrates a pair of assembled handles 112 secured to the elongated shaft 104 with the second part of the handle 112*b* extending perpendicularly outward from the elongated shaft 104. The handle 112 may be used by a user to provide leverage, isolate the muscles and/or tendons to stretch and allow the user to press the foam pad against a body part to assist in stretching. Using the handles in a horizontal position allows the user to isolate the muscles that are used and thus stretched. For example, the handles 112 in a horizontal position allow the upper arm bone to remain in a specific position allowing the upper back muscles to be stretched whereas without the handles in a horizontal position, biceps are stretched.

FIG. 4A illustrates a user utilizing a pair of stretching devices 102 for stretching the adductors or inner thighs of the user. The foam pads 106 are slidable along the elongated shaft 104 allowing for the pads to be comfortably placed against the legs of the user. As shown, the user may place the foam pads 106 of the stretching devices against the inner thighs. The user may then grab the handles and pull each of the stretching devices 102 outward in opposite directions causing a stretch on the inner thighs. Using the handles 112, the user may also pull down on the handles while engaging the core of the body. As shown in FIG. 4B, the stretching devices 102 may then be pushed inward causing a slight flex in the material of the elongated shafts 104, described in more detail below, allowing the user to strengthen the respective muscles and tendons.

According to another example, as shown in FIG. 5, a user may hold the stretching device 102 parallel to the ground using a pair of handles 112, a first handle located on the proximal end 104*a* of the elongated shaft 104 and a second handle located on the distal end 104*b* of the elongated shaft 104. In this position and pushing one of the handles with a hand, while maintaining a straight upper body, the core of the body may be utilized as the oblique muscles, front transverse abdominals, and lower back have to fight against the rotation stretching these muscles.

The elongated shaft 104 may be hollow, substantially cylindrical, and made from any material known in the art, such as Acrylonitrile Butadiene Styrene (ABS). To strengthen the muscles and tendons of the body in an elastic manner, the elongated shaft 104 must provide the right amount of flex. In an exemplary embodiment of the present disclosure, the inner diameter is 27 mm while the outer diameter is 35 mm. However, alternative diameters are within the scope of the present disclosure. For example, the inner diameter 27 mm and the outer diameter of 35 mm is the minimum ratio to provide the optimal amount of flex.

A thinner wall of the elongated shaft 104 would provide too much give and not function properly to provide the optimal stretching. As the outer diameter increases, there is more room to decrease the inner diameter which will provide a thicker wall and then more resistance to the flex in the ABS.

In some embodiments, the length of the elongated shaft 104 may be four (4) feet or six (6) feet. With the longer length of the elongated shaft 104 and the higher positions of the handles to the foot, there is less resistance to the natural flex of the elongated shaft 104. This is by way of example only and the length of the elongated shaft, may be less than four (4) feet, between four (4) feet and six (6) feet, or greater than six (6) feet.

According to one embodiment, the stretching device 102 may be used with a rotating platform 120 (See FIG. 6). The rotating platform 120 may comprise a base 122 fixedly located to a surface, such as the floor, and a platform 124 rotatably secured to the base 122 by a rotating mechanism 126. A T-connector 128 may be secured to the platform 124 by a pair of brackets 130 allowing the connector 128 to rotate with respect to the platform 124. As shown in FIG. 6, the distal end 104*b* of the elongated shaft 104 of the stretching device 102 may be inserted into an upper opening in the connector 128 allowing the stretching device 102 to pivot. It may also provide additional stability and rotational movements of the stretching device 102. Although a T-connector 128 is shown, any connector capable of securing the elongated shaft 104 to the rotating platform 120 may be used.

The base 122 of the rotating platform 120 is shown in FIG. 7 while FIG. 8 shows the elongated shaft 104 secured to the rotating platform 120. The T-connector 128 may include elongated slits 140 for securing straps or elastic bands 142 to the T-connector 128. The straps or elastic bands 142 may be used to secure the elongated shaft 104 to the rotating platform 120 providing resistance.

Turning to FIG. 9, the stretching device 102 in accordance with another aspect of the present disclosure is illustrated. As shown, the stretching device 102 has a first attachment 132 located at the proximal end 104*a* of the elongated member and a second attachment 134 located at the distal end 104*b* of the elongated member 104. According to one aspect, the first and second attachments 132, 134 may be handles. As shown, the first ends of the attachments 132, 134 are covered in pads 132*a*, 134*a* for comfort when the user is pressing against them, while the second ends of the attachments 132, 134 have balls 132*b*, 132*b*, such as massage balls, secured thereon.

According to one aspect, one or more connectors 136 may be detachably secured to the stretching device 102. The connectors 136 may be used to attach an exercise band 138 or other type of strap to aid in carrying the stretching device 102. The exercise band 138 may be made of an elastic material or any other material known in the art.

As shown, in one embodiment, four (4) connectors 136 may be utilized and the connectors 136 may be rings configured to receive the elastic band 138. Although the connectors 136 are shown as circular rings, this is by way of example only and different shapes and types of connectors may be utilized. For example, the connectors 136 may have an oval, rectangular or square shape.

According to one aspect, the connectors 136 may be detachably secured to the stretching device 102 using the first and second attachments 132, 134. The first ends of the attachments 132, 134 may threadingly engage with the threaded portion of the second ends of the attachments 132, 134. The connectors 136 may slip over the first and second ends of the attachments 132, 134 such that when the attachments 132, 134 are assembled and secured to the elongated shaft 104, the connectors 136 are secured to the stretching device 102. In one aspect, the connectors 136 may come secured to the band 138 so the band 102 is secured to the stretching device when the connectors 136 are secured to the stretching device 102. Alternatively, the band 138 may be secured to the connectors 136 after the connectors 136 have been secured to the stretching device 102 by sliding the band 138 through the connector 136.

"Comprise" and variations, such as "comprising" and "comprises", are not intended to exclude other additives, components, integers, or steps. "A", "an", and "the" and similar referents used herein are to be construed to cover both the singular and the plural unless their usage in context indicates otherwise. The word "exemplary" is used herein to mean "serving as an example, instance, or illustration." Any implementation or embodiment described herein as "exemplary" is not necessarily to be construed as preferred or advantageous over other embodiments or implementations. Likewise, "embodiments" does not require that all embodiments include the discussed feature, advantage or mode of operation.

"Aspects" do not require that all aspects of the disclosure include the discussed features, advantages, or modes of operation. "Coupled" is used herein to means the direct or indirect coupling between two objects. For example, if object A physically touches or couples to object B, and object B touches or couples to object C, then objects A and C may still be considered coupled to one another, even if they do not directly physically touch each other.

One or more of the components and functions illustrated in the FIGS. may be rearranged and/or combined into a single component or embodied in several components without departing from the invention. Additional elements or components may also be added without departing from the invention. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. A stretching device for stretching muscles of the human body, comprising: an elongated shaft extending along an axis having a proximal end and a distal end; a first plurality of holes extending along a length of the elongated shaft; a second plurality of holes extending along the length of the elongated shaft, where the first plurality of holes is in parallel alignment with the second plurality of holes; a foam pad slideably secured to an outer surface of the elongated shaft; and one or more attachments secured to the first and second plurality of holes in the elongated shaft Wherein the elongated shaft is hollow and cylindrical; wherein an inner diameter of the elongated shaft is 27 mm and an outer diameter of the elongated shaft is 35 mm; the stretching device further comprising a rotating platform, the rotating platform comprising: a base having a rotating mechanism secured thereon; a platform secured to the rotating mechanism, the platform configured to rotate with respect to the base; and a T-connector secured to the platform by a pair of bracket and configured to receive an end of the elongated shaft.

2. The stretching device of claim 1, wherein the elongated shaft is made from Acrylonitrile Butadiene Styrene.

3. The stretching device of claim 1, wherein the one or more attachments is a handle.

4. The stretching device of claim 3, wherein the handle is comprised of a first handle part and a second handle part where the first handle part is threadingly engaged with the second handle part.

5. The stretching device of claim 4, wherein the handle extends perpendicularly outward from the elongated shaft.

6. The stretching device of claim 1, wherein the one or more attachments is a ball for myofascial trigger point release and deep tissue massage.

7. A stretching device for stretching muscles of the human body, comprising:

- an elongated shaft extending along an axis having a proximal end and a distal end;
- a first plurality of holes extending along a length of the elongated shaft;
- a second plurality of holes extending along the length of the elongated shaft, where the first plurality of holes is in parallel alignment with the second plurality of holes;
- a foam pad slideably secured to an outer surface of the elongated shaft;
- one or more attachments secured to the first and second plurality of holes in the elongated shaft; and
- a rotating platform, the rotating platform comprising:
  - a base having a rotating mechanism secured thereon;
  - a platform secured to the rotating mechanism, the platform configured to rotate with resect to the base; and
    - a T-connector secured to the platform by a pair of bracket and configured to receive an end of the elongated shaft.

8. The stretching device of claim 7, wherein the elongated shaft is hollow and cylindrical.

9. The stretching device of claim 8, wherein an inner diameter of the elongated shaft is 27 mm and an outer diameter of the elongated shaft is 35 mm.

10. A stretching device for stretching muscles of the human body, comprising:

- an elongated shaft extending along an axis having a proximal end and a distal end;
- a first plurality of holes extending along a length of the elongated shaft;

a second plurality of holes extending along the length of the elongated shaft, where the first plurality of holes is in parallel alignment with the second plurality of holes;

a foam pad slideably secured to an outer surface of the elongated shaft; and one or more attachments secured to the first and second plurality of holes in the elongated shaft; and wherein an inner diameter of the elongated shaft is 27 mm and an outer diameter of the elongated shaft is 35 mm.

11. The stretching device of claim 10, further comprising a rotating platform, the rotating platform comprising:

a base having a rotating mechanism secured thereon;

a platform secured to the rotating mechanism, the platform configured to rotate with resect to the base; and a T-connector secured to the platform by a pair of bracket and configured to receive an end of the elongated shaft.

12. The stretching device of claim 10, wherein the elongated shaft is hollow and cylindrical.

13. The stretching device of claim 10, wherein the elongated shaft is made from Acrylonitrile Butadiene Styrene.

14. The stretching device of claim 10, wherein the one or more attachments is a handle.

15. The stretching device of claim 14, wherein the handle is comprised of a first handle part and a second handle part where the first handle part is threadingly engaged with the second handle part.

16. The stretching device of claim 15, wherein the handle extends perpendicularly outward from the elongated shaft.

17. The stretching device of claim 10, wherein the one or more attachments is a ball for myofascial trigger point release and deep tissue massage.

* * * * *